United States Patent [19]

Korner et al.

[11] 4,197,438

[45] Apr. 8, 1980

[54] ELECTRIC SWITCH

[75] Inventors: Gerhard Körner, Schriesheim; Werner König, Heddesheim, both of Fed. Rep. of Germany

[73] Assignee: BBC Brown, Boveri & Cie AG, Mannheim, Fed. Rep. of Germany

[21] Appl. No.: 844,192

[22] Filed: Oct. 21, 1977

[30] Foreign Application Priority Data

Oct. 22, 1976 [DE] Fed. Rep. of Germany ....... 2647779

[51] Int. Cl.² .................... H01H 33/14; H01H 33/54
[52] U.S. Cl. ............................... 200/145; 200/148 R; 200/148 D
[58] Field of Search ................ 200/145, 148 R, 148 D

[56] References Cited

U.S. PATENT DOCUMENTS

| 3,236,978 | 2/1966 | Lester | 200/145 |
| 3,567,887 | 3/1971 | Maloney | 200/145 |

FOREIGN PATENT DOCUMENTS

| 487543 | 12/1929 | Fed. Rep. of Germany | 200/145 |
| 2543588 | 3/1977 | Fed. Rep. of Germany | 200/145 |

Primary Examiner—Robert S. Macon
Attorney, Agent, or Firm—Oblon, Fisher, Spivak, McClelland & Maier

[57] ABSTRACT

An electric switch, for use as a high-voltage circuit breaker, having a plurality of quenching chambers per switch pole, with each of the quenching chambers radially disposed in a common actuator shaft. The quenching chambers disposed in the common actuator shaft are then placed in a closed vessel having a toroidal shape.

5 Claims, 2 Drawing Figures

ELECTRIC SWITCH

BACKGROUND OF THE INVENTION

1. Field of the Invention

This invention relates to an electric switch, and in particular a high-voltage circuit breaker with a plurality of quenching chambers per switch pole.

2. Description of the Prior Art

High-voltage circuit breakers are well known which utilize cylindrical capsules of different sizes. Typically these circuit breakers employ two or three quenching chambers per capsule, such that two capsules of suitable size are fastened together by flanges to produce a switch pole with four to six quenching chambers. However, these circuit breakers typically used capsules of different types, and have therefore proven to be complicated and costly.

In switches with more than one quenching chamber per switch pole, the quenching chambers are connected in tandem. A switch actuator rod along side the switch operates each set of contacts through a corresponding intermediate member. In switches of this type, however, the switch actuator rod is required to transmit large forces in the axial direction. These forces can cause switch housing vibrations which are potentially harmful to the insulator feed throughs mounted on the switch housing. In the past, the remedial measures necessary for overcoming this problem have resulted in additional cost increases.

SUMMARY OF THE INVENTION

Accordingly, one object of this invention is to create a high-voltage circuit breaker with a plurality of quenching chambers per switch pole.

Another object of this invention is to produce a high-voltage circuit breaker wherein the number of quenching chambers per switch pole can be changed to suit differing technical requirements, but which can nevertheless be installed in a single capsule designed for that purpose.

A further object of this invention is to produce a high-voltage circuit breaker which is switched by a reaction-free actuator.

These and other objects of this invention are achieved by providing a high-voltage circuit breaker with several quenching chambers radially disposed about a common actuator shaft located inside a closed vessel. The closed vessel has a circular cross-section and is toroidal in shape. The closed vessel furthermore is dimensioned to optimally accommodate three to six quenching chambers. As a result of the radial positioning of the quenching chambers around a centrally located actuator, each quenching chamber directly engages the common actuator shaft by way of its switch actuator rod, thereby promoting a compact switching mechanism. Furthermore, the centrally located actuator operates in a largely reaction-free manner, since mechanical switching shocks and the attendant housing vibrations are substantially eliminated, thereby resulting in a significantly improved smooth-operating switch. As a result, remedial measures necessary for overcoming the mechanical vibration problem are obviated.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
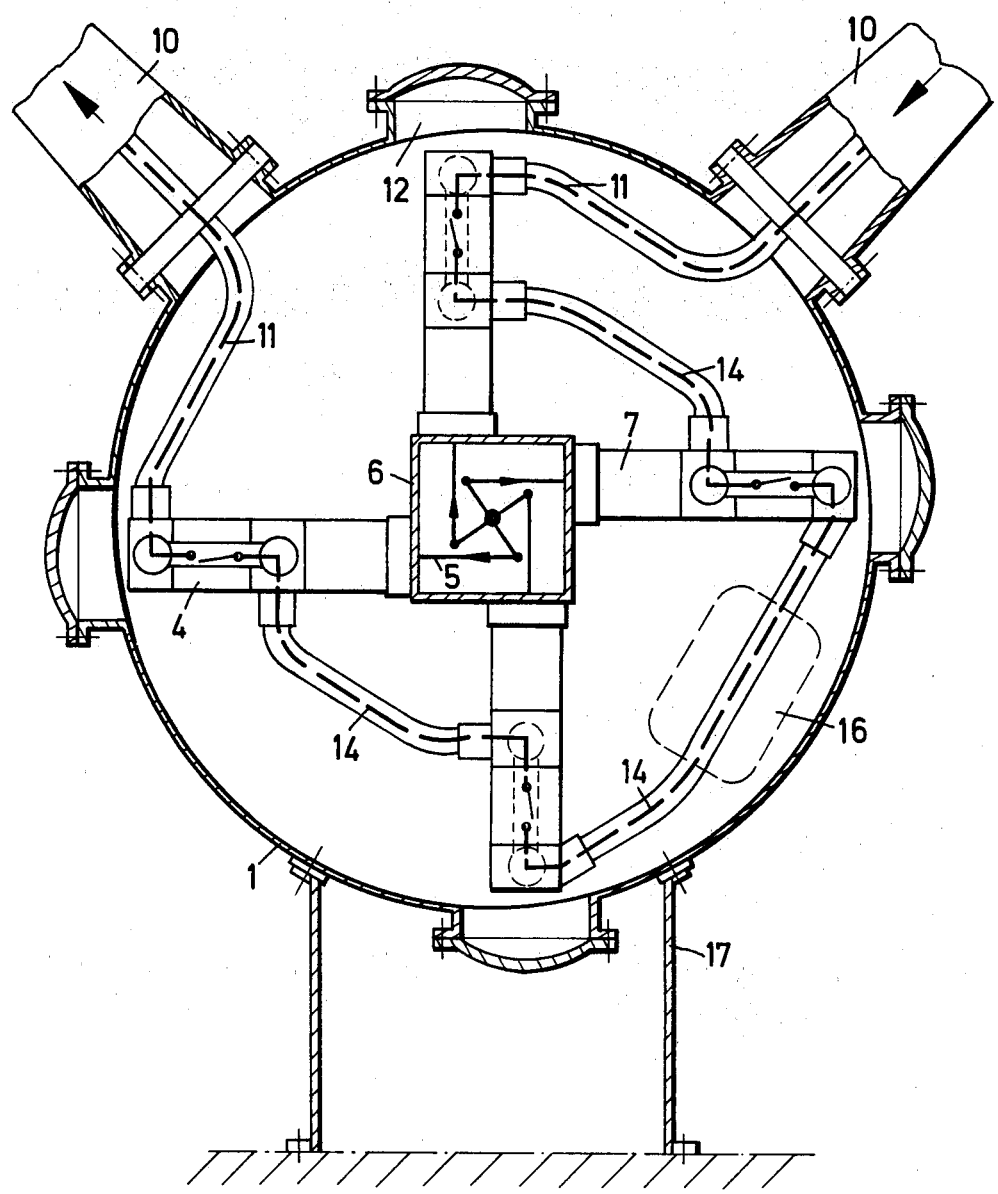
FIG. 1 is a longitudinal section through a switch with a closed vessel construction having four quenching chambers per switch pole.
Figure 2:
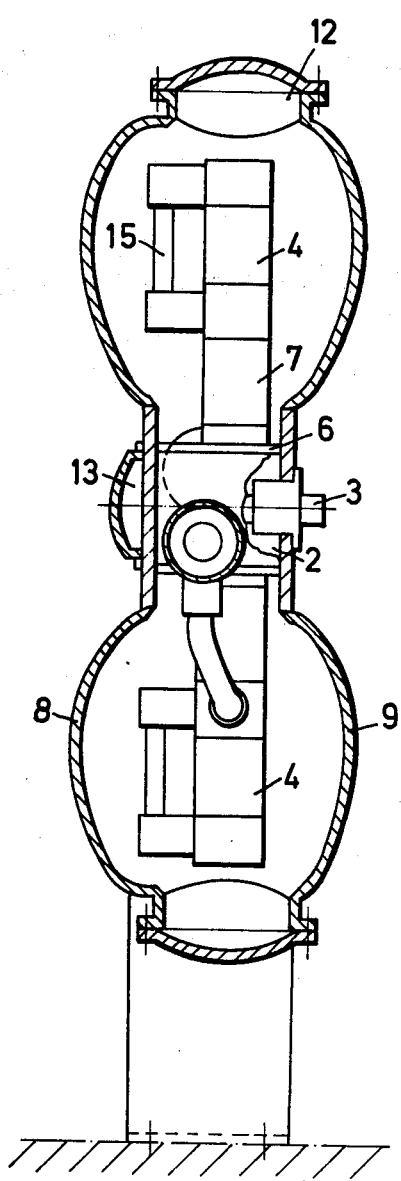
FIG. 2 is a cross-sectional view of the switch of FIGURE 1.

Referring now to the drawing, wherein like reference numerals designate identical or corresponding parts throughout the several views, these two figures show an electric switch, the casing of which is a closed vessel 1 with a circular periphery. A switch actuator 2 is located centrally within its actuator shaft 3 along the axis of the vessel. Quenching chambers 4 are radially positioned around the switch actuator and the common actuator shaft in a star-network configuration. Quenching chambers 4 are operated by their switch actuator rods 5 from the common actuator shaft 3 from which the quenching chambers are off-set with respect to one another. The switch actuator is surrounded by a tubular structure of square cross-section which serves as the support 6 for the quenching chambers. The quenching chambers are fastened at one end to the four sides of the support 6 through insulators 7. Thus, a square cross-section support can be used to connect as many as four quenching chambers. In a similar fashion, a support with a hexagonal cross-section can be used to attach as many as six quenching chambers. In addition, the support 6 is also used for stabilizing the two side walls 8 and 9 of the vessel 1, which are suitably bowed outwardly for this same purpose. On the periphery of the vessel 1 there are mounted two feed-through insulators 10 for the phase conductor 11. Also on the periphery of the vessel are access holes 13 to the quenching chambers. It is also possible to mount the feed-through insulators in the access holes 13, and thereby optimize the use of the vessel circumference. An additional access hole 13 is provided for the switch actuator 2. The various quenching chambers are connected in series with the phase conductor 11 by the electrical connection 14 and thus form a switch pole with four quenching chambers or break chambers. Control capacitors 15 are placed in parallel with the switches and the quenching chambers. A current transformer 16 is also installed in the vessel 1. The switch is fastened to the floor by means of the holder 17.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electric switch for use as a high-voltage circuit breaker comprising:

at least four quenching chambers per switch pole with each of said quenching chambers being in the same horizontal plane and radially disposed in a star-network configuration about a common actuator located in the center of said quenching chambers; said plurality of quenching chambers and said common actuator being located in a circular closed vessel in cross-section and having a toroidal shape; said plurality of quenching chambers including switch means located therein that are switched in series.

2. An electric switch according to claim 1, wherein: said closed vessel is provided with access holes in its circumference to said quenching chambers.

3. A compact electrical high-voltage circuit breaker comprising:

at least four quenching chambers per switch pole with each of said quenching chambers being radially disposed, on the same plane, about a common actuator shaft; said plurality of quenching chambers each containing a switch means that is connected in series with other switch means in said plurality of quenching chambers; said plurality of quenching chambers further including switch actuator rods, for actuating said switch means, connected in a star-network pattern about said common actuator shaft;

a circular closed vessel in cross-section of toroidal shape housing said plurality of quenching chambers and said common actuator shaft; said circular closed vessel including more than one feed through insulator means for input and output conductors that are connected in series with all of said switch means;

a tubular means extending through the center of said circular closed vessel of toroidal shape for supporting said common actuator shaft and said plurality of quenching chambers; said plurality of quenching chambers being connected to said tubular means through insulator means.

4. The compact electrical high-voltage circuit breaker of claim 3 wherein said switch actuator rods are offset with respect to the center of said circular closed vessel to allow for sliding movement when said common actuator shaft is rotated.

5. The compact electrical high-voltage circuit breaker of claim 3 wherein the shape of said tubular means determines the number of quenching chambers to be accommodated by said circular closed vessel.

* * * * *